United States Patent
Guttman et al.

(10) Patent No.: US 8,988,673 B2
(45) Date of Patent: Mar. 24, 2015

(54) BEAM SCATTERING LASER MONITOR

(75) Inventors: Jeffrey L. Guttman, Los Gatos, CA (US); John M. Fleischer, San Jose, CA (US); Mark E. Minshall, San Jose, CA (US)

(73) Assignee: Ophir-Spiricon, LLC, Logan, UT (US)

( * ) Notice: Subject to any disclaimer, the term of this patent is extended or adjusted under 35 U.S.C. 154(b) by 251 days.

(21) Appl. No.: 13/636,339

(22) PCT Filed: Mar. 23, 2011

(86) PCT No.: PCT/US2011/029610
§ 371 (c)(1),
(2), (4) Date: Sep. 21, 2012

(87) PCT Pub. No.: WO2011/119721
PCT Pub. Date: Sep. 29, 2011

(65) Prior Publication Data
US 2013/0016358 A1    Jan. 17, 2013

Related U.S. Application Data

(60) Provisional application No. 61/340,786, filed on Mar. 23, 2010.

(51) Int. Cl.
*G01J 1/00* (2006.01)
*G01J 1/42* (2006.01)
(Continued)

(52) U.S. Cl.
CPC .......... *G01J 1/4257* (2013.01); *G01J 1/02* (2013.01); *G01J 1/0214* (2013.01); *G01J 1/04* (2013.01); *G01J 1/0422* (2013.01)
USPC .......................................... 356/121; 356/301

(58) Field of Classification Search
USPC .......................................... 356/121–123, 301
See application file for complete search history.

(56) References Cited

U.S. PATENT DOCUMENTS 4,240,746 A * 12/1980 Courtenay et al. ............ 356/5.05
4,788,443 A * 11/1988 Furuya ............................ 250/574

FOREIGN PATENT DOCUMENTS

JP    S62-273419      11/1987
JP    H01-297517 A    11/1989
(Continued)

OTHER PUBLICATIONS

Comments on publications in Japanese office action.
(Continued)

*Primary Examiner* — Hoa Pham
(74) *Attorney, Agent, or Firm* — Fourth Dimension IP; Daniel Feigelson

(57) ABSTRACT

New systems for characterizing laser beams, using measurements performed on light which has been Rayleigh scattered from the beam. Different implementations are used for beam profiling, using images of the Rayleigh scattered light, and for laser beam power measurement, using the integrated Rayleigh scattered light. Both of these implementations can be applied to laser beams having high powers, since the measurements do not require insertion of any element into the beam itself, but rather depend on light scattered laterally from the passing beam. The measurements can thus be termed "non contact" measurements, in contrast to prior art methods which require an element inserted into the beam. The systems use Rayleigh scattering from the laser beam passing through ambient air, such that no special scattering chambers or liquids are required for the measurements. Special cancellation algorithms or filters are used to discriminate from light arising from scattering from dust particles.

14 Claims, 6 Drawing Sheets

(51) Int. Cl.
*G01J 1/02* (2006.01)
*G01J 1/04* (2006.01)

(56) References Cited

FOREIGN PATENT DOCUMENTS

| JP | H02-026353 U | 12/1991 |
| JP | H08-220465 A | 8/1996 |
| JP | 2008-527366 | 7/2008 |
| WO | 2006/075171 | 7/2006 |

OTHER PUBLICATIONS

English translation of office action in Japanese Patent Application No. 2013-501432, Nov. 28, 2014.

* cited by examiner

BEAM SCATTERING LASER MONITOR

RELATED APPLICATIONS

This application is a §371 of PCT/US2011/029610, filed Mar. 23, 2011 and claiming priority from U.S. Provisional Application No. 61/340,786, entitled "'Laser beam profiler by air scattering", filed Mar. 23, 2010, and listing Jeffrey L. Guttman as the first inventor. Priority from, and benefit of, both of these applications is claimed as appropriate. The contents of these applications are incorporated herein by reference.

FIELD OF THE INVENTION

The present invention relates to the field of laser beam measurements using Rayleigh scattering of the air molecules in the path of the laser beam, especially for beam profile measurements and beam power measurements.

BACKGROUND OF THE INVENTION

Regarding all laser beams, but especially those for use in material processing applications, the two main beam parameters which a user may need to measure are the total beam power and the spatial profile of the beam. Total beam power is measured by means of a laser power meter, of which many kinds exist in the market. A laser beam profiler measures the spatial irradiance distribution of the laser beam in order to characterize the beam. Beam parameters of interest include diameter, peak position, centroid position, beam uniformity. Other derived beam parameters include angular divergence and $M^2$ beam propagation ratio.

A conventional method of measuring a laser beam profile with a camera involves attenuating the laser beam by many orders of magnitude, and allowing it to impinge directly on the focal plane of a camera, the attenuation bringing the incident radiation down to the measurement range of the camera. As an alternative, a beam splitter or output coupler can be used to couple out a small portion of the beam, which is then directed into the camera. Another method of measuring a laser beam profile with a camera involves directing the laser beam onto a diffuse scatterer, and measuring the image at the surface of the diffuse scatterer with a camera. With all of these methods the beam is measured only at the position of the camera focal plane or the plane of the beam output coupler or scatterer. The camera generates an analog or digital video output, and a data acquisition system records the camera video for processing, analysis, display, or the like.

For high power laser beams, such methods may be impractical or difficult to implement because the high power beam, in the case of beam profile measurements, may damage the optical attenuator, beam splitter/output coupler or diffusion screen, and in the case of power measurements, may damage the beam absorber surface.

In the article entitled "Laser Beam Characterization by Using Rayleigh Scattering" by K. C. Jorge et al., published in Annals of Optics, Vol. 5, XXVI ENFMC (Brazilian National Meeting of Condensed Matter Physics), May 2003, there is described a method of passing a focused laser beam through a chamber filled with an aqueous aniline solution to render the propagating beam visible by means of the Rayleigh scattering emitted laterally to the beam path. This laterally scattered light is imaged using a CCD camera, and the scattered intensity at points along the beam path, which is a representation of the beam intensity at those points, enables the value of $M^2$ to be obtained.

However, the apparatus described in that article requires the use of a chamber filled with a liquid, which makes the apparatus cumbersome and complex to construct. Furthermore, that article does not mention or suggest how beam power could be measured.

There therefore exists a need for a system for measuring various characteristics of a laser beam which overcomes at least some of the disadvantages of prior art systems and methods.

The disclosures of each of the publications mentioned in this section and in other sections of the specification are hereby incorporated by reference, each in its entirety.

SUMMARY OF THE INVENTION

The present disclosure describes new exemplary systems for the characterizing of laser beams, using measurements performed on light which has been Rayleigh scattered from the beam. Different implementations of this technology can be used to construct a practical beam profiler, using images of the Rayleigh scattered light, or a laser beam power meter using the integrated Rayleigh scattered light. Both of these different implementations are capable of being applied to laser beams having very high powers, since measurements based on the Rayleigh scattering do not require insertion of any element whatsoever into the beam itself, but rather depend on light scattered laterally from the beam in transit. In this respect, the measurements can be termed "non-contact" measurements, in contrast to prior art methods which do require an element inserted into the beam in order to perform the measurement. The exemplary systems of the present disclosure use Rayleigh scattering from the laser beam passing through ambient air, such that no special scattering chambers or liquids are required for the measurements. The systems are portable and have a number of features which enable them to be set up in any environment, even a laser machining shop.

For the beam profiling measurements, the Rayleigh scattered light from a laser beam propagating in air is imaged either directly by a camera lens onto its focal plane, or is collected by a lens system and imaged onto an optical fiber bundle that transfers the light to a camera.

Since the level of the Rayleigh scattering is very small, the measurement sensitivity must be high, and is thus susceptible to interference from extraneous sources of light, such as scattering from particles of debris or dust in the measurement field of view, or from illumination coming from the background sources. Signals coming from dust particle scattering are very different from the signals arising from elastic scattering from the air molecules which constitutes the Rayleigh scattering which it is desired to measure. The dust scattered signals are orders of magnitude larger than the Rayleigh scattered signals, and are of a very localized nature both spatially and temporally. The exemplary systems of this disclosure use data processing algorithms that identify such signals scattered from dust and particles, most conveniently by means of pulse height discrimination or pulse width discrimination, and can thus reject data from such regions in the laser beam image. A low pass filter can be effectively used to eliminate sharp intensity pulses due to dust particle scattering. Additionally, in order to provide further immunity from particular interference, a filtered laminar air flow system can be incorporated, which will reduce the level of such particles in the air in the path of the laser beam. The background for background subtraction is determined directly from the acquired camera image itself.

As an alternative to the use of laminar flow systems, the dust contamination problem can be avoided by measuring the beam while in passage through a gas-filled chamber. However, such use of a dedicated chamber may render the apparatus more complex and bulky, and the need for end windows makes such an implementation depart from the advantages of a non-contact measurement system, which is simply applied to the beam in its ambient path. On the other hand, for measurement at wavelengths where the Rayleigh scattering effect is very low, such as for carbon dioxide laser beams, it may be advantageous to use high pressure gas fills with a gas having a high cross section for Rayleigh scattering, instead of ambient air at normal atmospheric pressure, from which the Rayleigh scattering at 10.6 µm is weak.

In order to provide the beam profile across several diametrical directions, multiple beam axis measurements can be performed by imaging the Rayleigh scattered light from a number of lateral directions.

In order to measure beam power using Rayleigh scattered light, the same system as is used for beam profiling can be used. However, in order to reduce interference from background scattered light, it would be more preferable to use an enclosed device through which the beam passes from one aperture to another. One such exemplary device is described comprising a cavity having an elliptically shaped internal mirror surface, in which the beam to be measured is passed through the cavity parallel to the mirror surface and through the position of one of the ellipse foci. A detector is positioned at the second focus, and this detects Rayleigh scattered light emitted by the beam directly onto the detector, and also any Rayleigh scattered light emitted in other directions but focused by the elliptic mirror onto the detector at the second focus. The detector thus effectively integrates all of the light Rayleigh scattered from the beam, yet without having to physically intercept the beam at all. The signal at the detector is amplified and processed and, since Rayleigh scattering is a linear effect, the signal is proportional to the power of the laser beam. Other systems which collect Rayleigh scattered light from a large angular orientation around the beam axis include parabolic mirrors which generate collimated light beams for focusing on the detector, and arrangements of positive lenses for achieving a similar result.

One exemplary implementation involves a method for characterizing a beam of light, the method comprising:
(i) imaging the beam of light while it is propagating in ambient air through a sampling region, such that images can be obtained of light scattered from the sampling region in a generally lateral direction to the direction of the beam propagation,
(ii) treating image data associated with the images with a pulse discriminator to remove from the image data signals having at least one of intensity, spatial or temporal characteristics outside of predetermined parameters for the image data, and
(iii) processing the treated image data to determine a characteristic of the beam of light at least one location in the sampling region.

In such a method, the processing may comprise the determination of the intensity of the scattered light as a function of position across the beam of light, such that the characteristic is an intensity profile of the beam of light. This method may then further comprise the determination of the width of the beam at the aforementioned at least one point in the sampling region. Additionally, the method can further comprise the determination of the beam width at a plurality of locations along the beam, such that a spatial image of the beam is obtained along its propagation path. The beam waist may thus be determined from the spatial image of the beam along its propagation path.

In alternative implementations of the above described methods, the processing may comprise the integration of the image data associated with the intensity of the scattered light obtained across the beam of light, over a predetermined length of the beam path, such that the characteristic is a power measurement of the beam of light.

In some implementations of these methods, the pulse discriminator may be a low pass filter, such that pulses of shorter temporal duration than a predetermined level are filtered out. Alternatively, the pulse discriminator may be a threshold limiter, such that pulses of higher intensity than a predetermined level are filtered out. The method may further involve calculating the beam characteristic for a plurality of locations down the beam path, such that a spatial representation of the beam characteristic is obtained down the propagation path of the beam. In such a case, the pulse discriminator may be an algorithm for determining the spatial width of changes in the imaged intensity of the scattered light down the propagation path of the beam, and for filtering out pulses of narrower spatial width than a predetermined width.

Still other example implementations involve a method in which utilizing a laminar flow of filtered gas is passed across the beam of light, such that particular contamination in the path of the beam of light is reduced.

In yet more implementations, the imaging of the beam of light may be performed in a plurality of directions around the axis of the beam of light. This method can be executed either by reflecting light scattered from different radial directions into one common direction for imaging by a single imaging device, or by collecting light scattered from different radial directions in separate fiber optical devices, directed into a single imaging device.

Finally, such methods may be such that if the beam of light is a laser beam, the method enables the beam to be characterized without the need of the beam to contact any element in the beam path.

Further example implementations involve a system comprising:
(i) a sampling region in the air through which the path of the beam of light passes,
(ii) an imaging device focused onto at least part of the sampling region, such that it images light scattered in a generally lateral direction to the direction of the path of the beam of light,
(iii) a pulse discriminator to remove from the images, data signals having at least one of intensity, spatial or temporal characteristics outside of predetermined parameters for the image data, and
(iv) an image processor operating on image signals after treatment by the pulse discriminator, the image processor determining a characteristic of the beam of light at least one location in the sampling region.

In such a system, the image processor may comprise a profile generator for the determination of the intensity of the scattered light as a function of position across the beam of light, such that the characteristic is an intensity profile of the beam of light. The profile generator may determine the width of the beam at the aforementioned at least one location in the sampling region. Additionally, the determination of the beam width may be performed at a plurality of locations along the beam, such that a spatial image of the beam is obtained along its propagation path. The system may thus determine the position of the beam waist from the spatial image of the beam. In alternative implementations of the above described systems, the image processor may integrate the image data associated with the intensity of the scattered light obtained across the beam of light, over a predetermined length of the beam path, such that the characteristic is a power measurement of the beam of light.

In some implementations of these systems, the pulse discriminator may be a low pass filter, such that pulses of shorter temporal duration than a predetermined level are filtered out. Alternatively, the pulse discriminator may be a threshold limiter, such that pulses of higher intensity than a predetermined level are filtered out. The system may further be such that the image processor determines the beam characteristic for a plurality of locations down the beam path, such that a spatial representation of the beam characteristic is obtained down the propagation path of the beam. In such a case, the pulse discriminator may include an algorithm for determining the spatial width of changes in the imaged intensity of the scattered light down the propagation path of the beam, and for filtering out pulses of narrower spatial width than a predetermined width.

Still other example implementations involve a system as described hereinabove, and further comprising a laminar flow system for flowing filtered gas across the beam of light, such that particular contamination in the path of the beam of light is reduced.

In yet more implementations, the imaging device may be adapted to image light scattered in a plurality of directions around the axis of the beam of light. The system can then further comprise either at least one reflector for reflecting light scattered from at least one different radial direction, into the imaging device, or a plurality of fiber optical devices, wherein light scattered from different radial directions is collected by separate fiber optical devices, and directed for imaging into the imaging device.

Finally, such systems may be such that if the beam of light is a laser beam, the system enables the beam to be characterized without the need of the beam to contact any element in the beam path.

Still other example implementations involve a device for measuring the power of a beam of light, the device comprising:
(i) a light concentrating element directing light from a sampling region in the air through which the path of the beam of light passes, and which is scattered in directions radially disposed to the beam path, towards a detection plane,
(ii) a light detector disposed at the detection plane such that it measures the light directed thereto from the light concentrating element, and
(iii) an output module which determines the power of the beam of light from the output of the light detector.

In such a device, the power of the beam may be determined in accordance with a predetermined calibration factor for the device. Additionally, the device may further comprise a discriminating system for removing light signals generated by scattering from particular debris in the path of the beam of light.

In any of such above described devices, the light concentrating element may comprise a reflector having an elliptic profile, the reflector being disposed such that the path of the beam of light passes through one focus of the elliptic profile, and the detection plane includes the second focus of the elliptic profile.

Alternatively, the light concentrating element may comprise a reflector having a parabolic profile, the reflector being disposed such that the path of the beam of light passes through its focus, and a focusing lens disposed in front of the reflector such that it collects light scattered from the beam of light and reflected from the parabolic reflector, and light scattered from the beam of light and received directly therefrom, wherein the focusing lens is disposed at a distance equal to its focal length from the detection plane.

In further exemplary implementations, the light concentrating element may comprise a first lens disposed such that the path of the beam of light passes through its first focus, such that light scattered from the beam of light is collimated by the first lens, and a second lens receiving the collimated light and focusing it towards the focal point of the second lens, wherein the second lens is disposed at a distance equal to its focal length from the detection plane. Alternatively, the light concentrating element may comprise a lens disposed such that the path of the beam of light passes through its center of curvature, such that light scattered from the beam of light is collected by the lens and focused at its conjugate center of curvature, wherein the lens is disposed such that the detection plane includes its conjugate center of curvature.

BRIEF DESCRIPTION OF THE DRAWINGS

The presently claimed invention will be understood and appreciated more fully from the following detailed description, taken in conjunction with the drawings in which:

DETAILED DESCRIPTION

Figure 1:
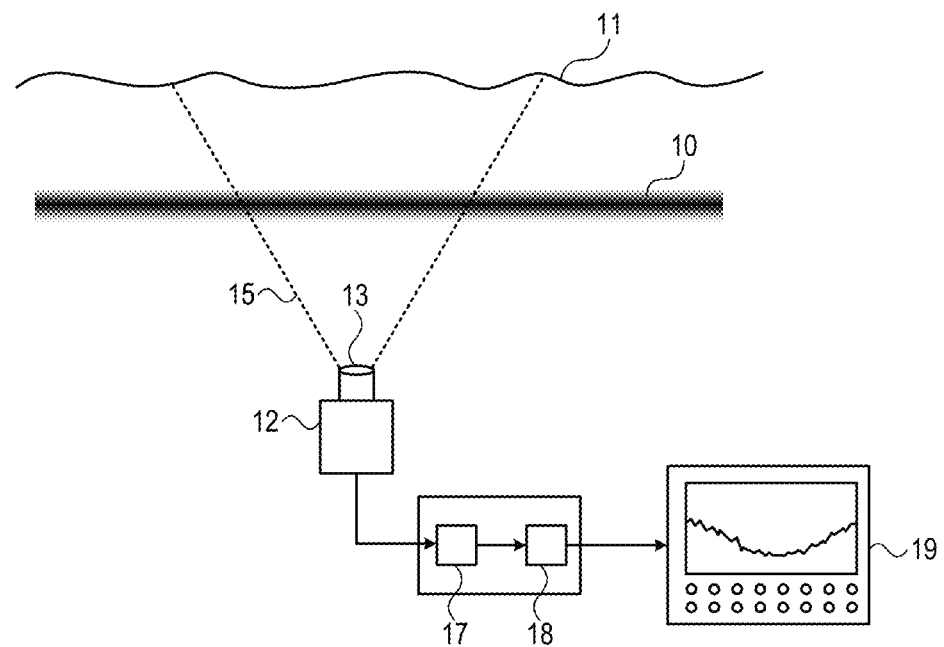
FIG. 1 illustrates schematically an exemplary laser beam characterization system, using Rayleigh scattering measurement.

Reference is now made to FIG. 1, which illustrates schematically an exemplary laser beam characterization system, using Rayleigh scattering measurement, of the type described in this disclosure. The laser beam 10 is directed through a sampling region of interest, which can be the ambient air present in the location where the beam is to be measured. The air molecules in the path of the laser beam Rayleigh scatter the light of the laser beam in all directions. The sampling region is imaged, preferably normal to the direction of the beam path, by an imaging device such as a CCD camera 12 with a lens 13 designed to cover the sampling region of the beam, as indicated by the extremities 15 of the field of view along the beam path direction. Since it is usually desired to image a section of the beam path substantially longer than the beam diameter, the lens can advantageously be of partially cylindrical design, so that each image frame has far more image pixels along the length of the beam than perpendicular thereto. Since the scattering medium is optically thin, the image of the Rayleigh scattered light is a faithful representation of the beam intensity across the diameter of the beam, such that the profile of the beam can be obtained from the intensity profile of the image of the Rayleigh scattered light. The CCD camera can thus perform non-contact profiling of the beam.

The signal from the CCD camera 12 is directed into an image-processing module 17, where the data of the image is analyzed in order to extract the desired beam characteristics. In order to eliminate spurious scattered intensity arising from dust particle scattering, the signal is also directed through a pulse discriminator 18, which subtracts out such pulses from the signal to be measured, most conveniently by one of the methods mentioned in the summary section of this disclosure. After being so processed, the signal is led to a profile generating unit 19, which can calculate, plot and display the changing diameter of the beam as it crosses the sampling region, and the intensity profile of the beam in the plane perpendicular to the direction of the field of view of the imaging camera.

The specific manner by which the system is programmed to handle the images of the Rayleigh scattering emitted by the beam in the sampling region of interest, is dependent on the beam characteristics which it is desired to obtain from the system. The images themselves comprise a side view of the beam caustic, as defined by the Rayleigh scattered light emitted laterally from the beam. Therefore, a visual or computer-based view of the image is able to determine the beam width as a function of distance down the beam path. Thus, from the images themselves the position of the beam waist, for instance, can be directly observed. The beam profile, on the other hand, requires analysis of the intensity of the Rayleigh scattering across the width of the imaged beam. This is advantageously obtained by means of signal processing of the image, pixel by pixel, or groups of pixels by groups of pixels. In the first place, it is necessary to define the position down the beam path at which the instantaneous measurement is being made, and over how long a section of the beam path this measurement is being made. In addition it is necessary to define the distance either side of the beam, (which, in the arrangement of FIG. 1 means above or below the beam), over which the image data is measured in order to determine the full extent of the width of the beam. These selections may be achieved by using a variable width and variable height sampling box, whose dimensions are set according to the extent of the section of the image to be measured. Thus for high resolution measurements along the beam caustic, a sample only a single pixel wide may perhaps be used, and the width of the beam may be measured over a few pixels in the vertical direction across the beam. At each sampled position, the pixel readings are input to the image processing program, and the complete stored image data file may then be analyzed for the presence of dust interference by the pulse discriminating unit 18, and any such presence may be extracted out in the software program. From this data, a plot of the beam profile can then be generated.

The system can be used to measure both CW and pulsed laser beams. However, for the pulsed beams, it is important to use a detector having a sufficiently fast response time that it can be gated to measure only during pulse ON periods.

Since the intensity of the Rayleigh scattered light from the air molecules is so low, it is very important to eliminate all extraneous background sources of light, such as that due to reflection from other articles in the vicinity of the beam, of the light scattered in other directions. Conventional beam profiling methods use background subtraction that involves taking an image frame of data with the laser under measurement turned off. However, this method cannot be used for the Rayleigh scatter technique used in the instruments of the present disclosure because it is the Rayleigh-scattered laser light itself that generates the "background". More specifically, the Rayleigh-scattered laser light illuminates every object in the vicinity, generating secondary scatter, and the imaging camera is as sensitive to this secondary scatter as it is to the direct scatter, and thus measures it as well as the direct scattered laser light. Methods can be used to reduce the scattered background through the use of non-reflecting absorbent surfaces 11. Optical baffles can also be employed to minimize the effects of background scatter. However for Rayleigh scatter profiling in the presence of any remaining secondary scatter, it is necessary to perform an in-situ background correction, derived from the profile data frame. One method is to inspect the level of the background illumination received at positions not on the beam path, in order to detect any changes in the level, which would be indicative of changes in the level of the reflected background scattered light entering the camera. An average level outside of the beam position itself can then be taken as typical of the average background level, to be subtracted from other intensity readings of the beam itself to provide the true level. This is only one suggested method of real-time background correction, and it is to be understood that any other data manipulation method which can be used to reduce an overall background may be equally well used depending on the level and uniformity of the background.

Figure 2:
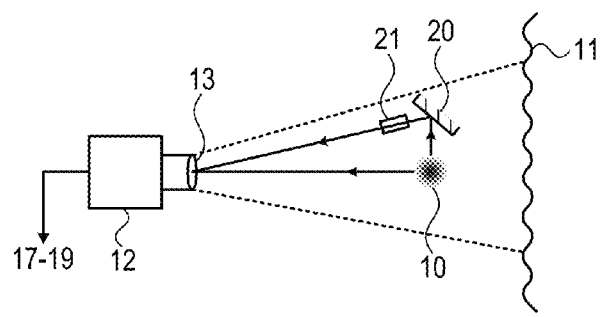
FIG. 2 illustrates a laser beam characterization system similar to that of FIG. 1 but capable of viewing the beam from two orthogonal directions.

The implementation shown in FIG. 1 is suitable for viewing the beam profile or diameter from a single direction from the side of the laser beam, in this case that in the plane of the drawing. However, since beams may be asymmetric in form, it may be important to determine the diameter of the beam or its profile from a number of angularly different directions perpendicular to the beam axis. This could be achieved by using two separate cameras for viewing from the two desired directions. However, reference is now made to FIG. 2 which illustrates one exemplary method by which the beam profile and diameter can be determined at two orthogonal directions using a single camera. FIG. 2 shows a view down the beam axis 10, with the imaging camera 12 generating images of the Rayleigh scattered light issued in what is the horizontal direction in the drawing, thereby determining the beam profile and diameter in what is the vertical direction in the drawing. A reflecting surface 20 is positioned above the beam, such that it reflects the Rayleigh scattered light emitted at 90° to that directly imaged in the field of view of the camera. The mirror is aligned at an angle such that the vertically emitted light (in the sense of the drawing coordinates) is reflected into the camera 12 through the objective lens 13. The camera thus views the beam from two orthogonally positioned directions, and the image processing program can be adapted to show the beam from both of these directions on a split screen, and to calculate independently parameters from both of these images.

Since the distance from the imaging lens 13 to the source of the light at the laser beam 10 is longer for the reflected scattered light path than for the directly scattered light path, a conventionally used camera would not generally be properly focused for both of these views. The beam measurements therefore require an imaging camera 12 with a large depth of field in order to properly display and measure both distributions of Rayleigh scattered light. This can be achieved using an iris aperture to form a near pinhole image, or by using a telecentric lens. As an alternative, in order to compensate for the longer path length of the reflected scattered light path, a compensating block 21, such as a block of glass having a refractive index higher than that of the air, is inserted into the reflected light path, in order to equalize the effective path lengths of the two beams.

The reflecting surface 20 can also be positioned to reflect scattered Rayleigh light from angles other than that orthogonal to the field of view direction of the camera.

Figure 3:
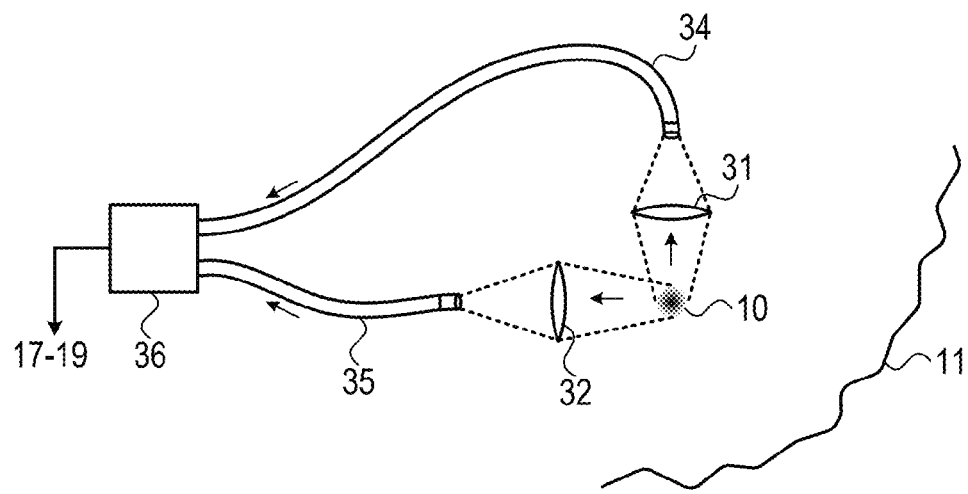
FIG. 3 illustrates an alternative exemplary method of viewing the beam profile from two sides having different angular orientations around the beam axis using coherent optical fiber bundles.

Reference is now made to FIG. 3, which illustrates an alternative exemplary method of viewing the beam profile from two sides having different angular orientations around the beam axis. In FIG. 3, use is made of optical pipes such as coherent fiber bundles in order to transfer the Rayleigh scattered light from the beam 10 to the camera 36. In FIG. 3, lenses 31, 32, are used to image the Rayleigh scattered light emitted from two different directions, onto the ends of two fiber bundles 34, 35 respectively, which transfer the light images to the camera 36, which is adapted to receive fiber optical image data. The background absorbing layer 11, should then be spatially positioned such that it reduces light reflections from directions which would enable such reflected background light to enter the imaging lenses 31, 32. Although only two fiber optical beam guides are shown in FIG. 3, it is to be understood that this implementation is not meant to be limited to the use of light collection in two directions but that more fiber bundles could be used to sample and view the beam from more than two directions. Furthermore, although the two fiber optical beam guides in FIG. 3 are shown orthogonally positioned, it is to be understood that this implementation is not meant to be limited to orthogonal directions, but that any desired directions could be chosen.

Figure 4:
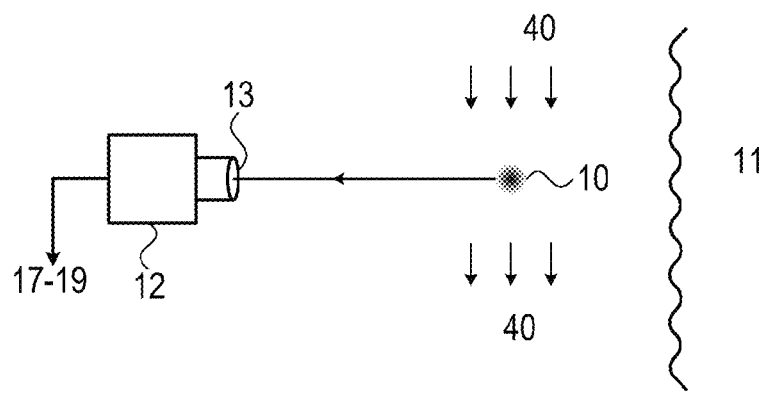
FIG. 4 shows a system such as is described in FIG. 1, with the addition of a filtered laminar flow system blowing clean filtered air across the laser beam in the region in which it is being imaged.

The systems described hereinabove using non-contact measurement of light beams, may be particularly advantageous for use in laser machine shops, where the very high power laser beams are used for material processing such as cutting, welding and heat treatment. In such applications the beam mode may have a strong influence on the quality of the material processing performed, and may therefore be important to continuously monitor the beam profile. However in exactly this sort of environment, there is likely to be a large amount of dust and debris in the ambient air, arising from the very nature of the processes being performed. Reference is now made to FIG. 4 which illustrates a further possible implementation for reducing the effect of airborne dust and debris on beam measurements, using the systems described hereinabove. In FIG. 4 is shown a directly viewed laser beam 10, for determining its beam characteristics. There is included a filtered laminar flow enclosure system 40, which blows clean filtered air across the laser beam 10 in the region in which it is being imaged, thereby sweeping away dust and debris from the laser beam path. This additional feature is particularly useful where heavy dust and debris contamination may be found, such as in a laser machine shop. It is to be understood that the system shown in FIG. 4 can be applied either in addition to, or as an alternative to the signal processing procedures for reducing dust interference described previously.

When making measurements close to the workpiece in a laser material processing application, such as when monitoring the behavior of the laser at the work surface, a bandpass filter at the laser wavelength can be used in order to filter out any plasma light emitted from the laser's interaction with the workpiece.

The systems described hereinabove can be used to determine a number of characteristics of the beam being sampled. The CCD camera typically used for imaging the beam may have 1000 or more pixels for imaging along the beam caustic, such that the beam diameter and profile can be measured with great resolution. One exemplary camera, used with the Beam Pro measurement system, provided by Photon Inc. of San Jose, Calif., has 1392 pixels in the horizontal direction along the length of the beam being sampled. The system can measure the beam diameter and the position of minimal beam waist when the beam is focused down. In addition, the beam profile can be measured at numerous positions along the beam caustic simultaneously, providing an output equivalent to a slit scan of the beam at those positions. This enables the system to measure the $M^2$ beam quality parameter in real time.

Figure 5A:
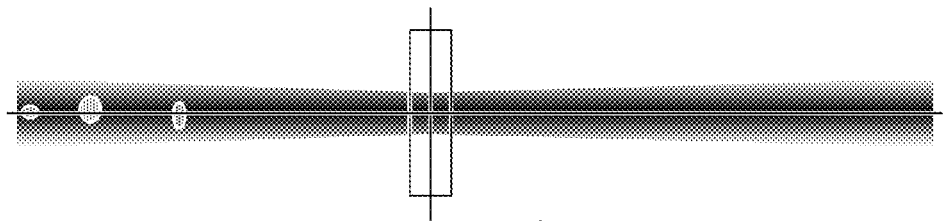
FIGS. 5A to 5C illustrate reproductions of screen images taken from the image processing and profile generating programs of the system of FIG. 1.
Figure 5B:
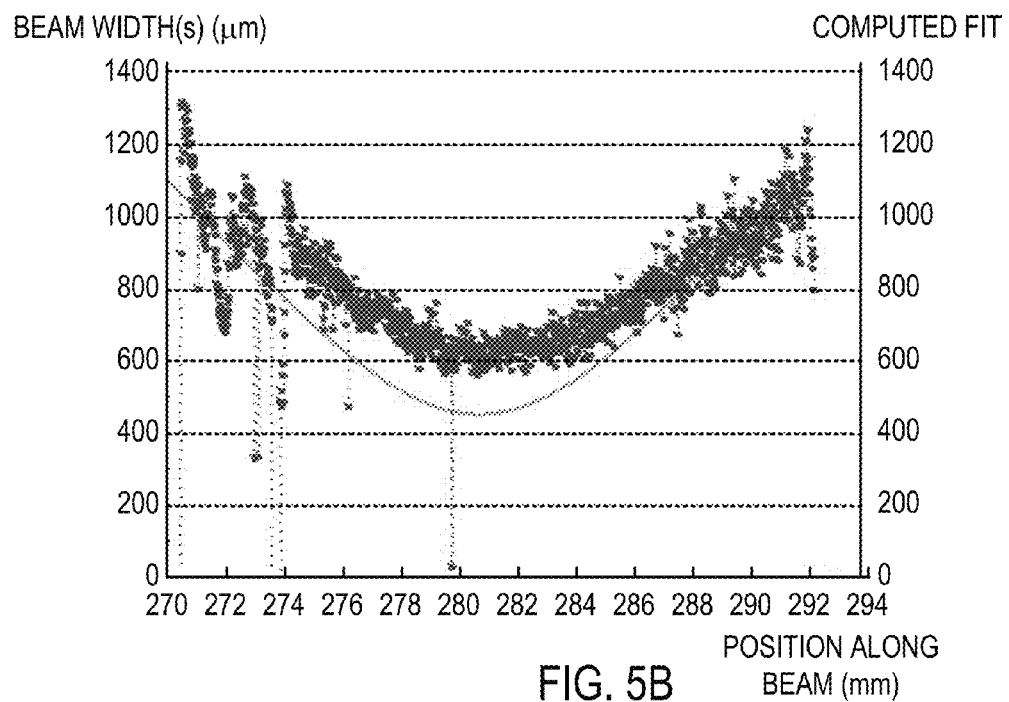
Figure 5C:
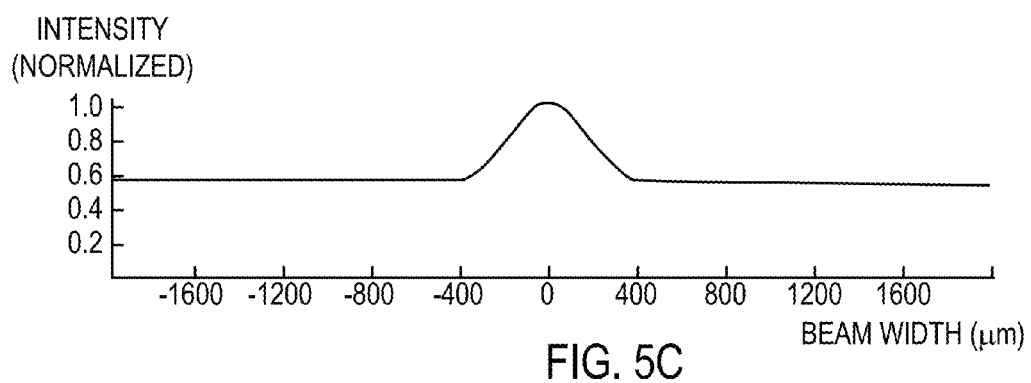

Reference is now made to FIGS. 5A to 5C which illustrate reproductions of screen images taken from the image processing and profile generating programs, used in a display and control unit suitable for calculation and display of the beam and its characteristics. FIGS. 5A to 5C were recorded on a 6 kW Nd:YAG laser beam. FIG. 5A is a reproduction of the displayed beam trace showing the imaged beam as recorded in the CCD camera 12 of FIG. 1. The profile of the beam shows the intensity at a maximum in the center of the beam, falling off towards the edges. The beam is centered on the horizontal cursor of the display unit. The vertical cursor shows the position at which the image processing software is collecting image pixel information for calculating characteristics of the beam in that specific region. The cursor can be scanned over the entire length of the beam image so that the intensity profile of the beam can be generated over the whole of the beam caustic. The rectangular box shows the limit of the data collection performed. The narrower the box, the less the number of image pixels taken for image data processing. The lower the height of the box, the less the region of the background outside of the beam, that is taken for background compensation. In the screen trace shown in FIG. 5A, the cursor box has been positioned at the beam waist. The three bright spots near the left hand side of the trace, represent three dust particles in the beam itself, which emits a high level of light, whether by direct beam scattering off the particles, or by combustion of the particles in the case of a high power laser beam. These are typical of dust interference, which the pulse discriminating software of the image processing module, attempts to cancel out as best as is possible. There may be other fainter dust interference intensity points at locations off of the beam path, which need to be dealt with in order to avoid incorrect background compensation.

FIG. 5B now shows a trace of the beam caustic about the beam waist, as observed from the processed image data. The abscissa of the trace is the distance along the beam path, and the ordinate is the beam width, as calculated at each selected pixel processing position. The beam waist is clearly shown in the displayed trace. The computed fit shown on the right hand ordinate is the fitted propagation caustic according to the ISO standard 11394. The fit is not so good in many places because of poor data at some points In FIG. 5B, the outrider points at the left hand side of the trace arise from the corrections performed for the dust particles seen at the left hand side of the beam caustic in FIG. 5A. The data are not fully corrected for the dust particles, leaving the disturbances seen in FIG. 5B. With better filtering, even those perturbations could be substantially reduced.

FIG. 5C is a calculated plot of the cross section of the beam at the position of the cursor in FIG. 5A, i.e. the intensity imaged in the pixels included in the cursor box shown in FIG. 5A, as a function of the vertical distance down the cursor box. The abscissa in this case is the beam width in micrometers. The approximate mode nature of the beam can be estimated from this plot.

Figure 6A:
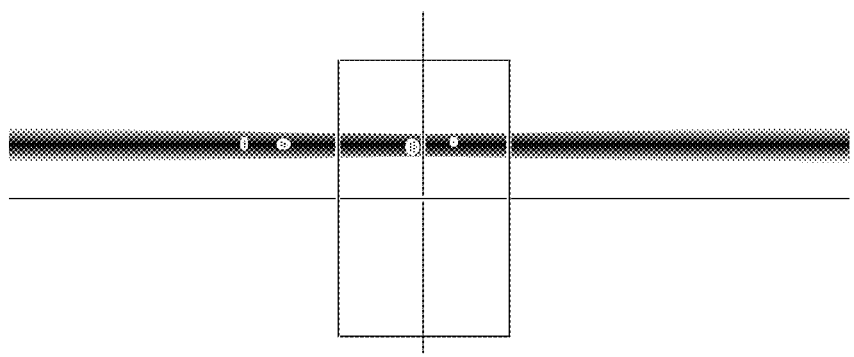
FIGS. 6A to 6C are similar to FIGS. 5A to 5C, but also illustrate how the beam power can be calculated using Rayleigh scattering measurements.
Figure 6B:
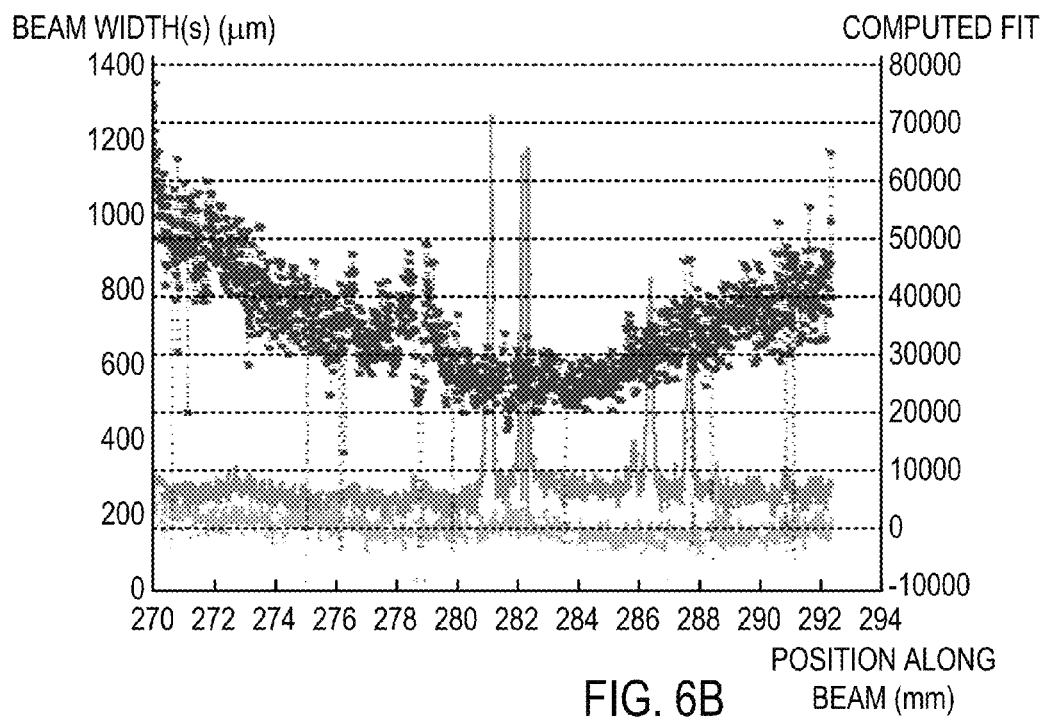
Figure 6C:
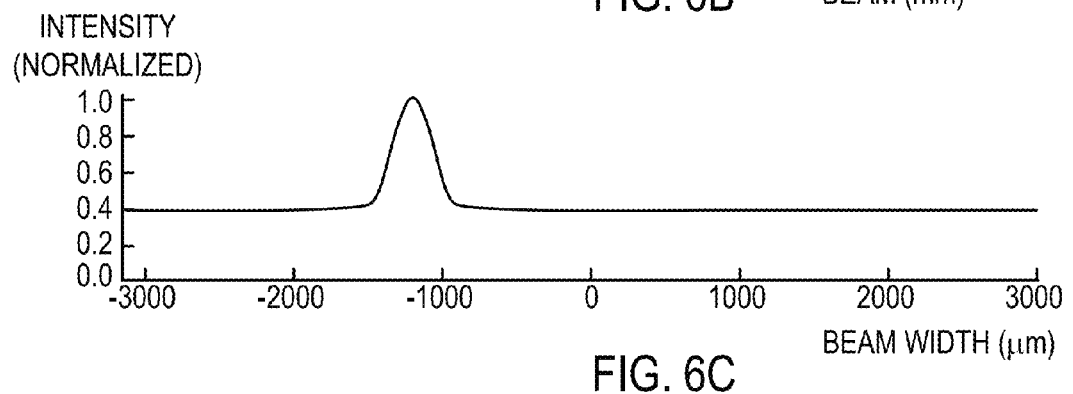

In the above described implementations, there has been shown to measure various beam characteristics such as beam profile, beam waist position, $M^2$, and other parameters associated with the beam parameters. Reference is now made to FIGS. 6A to 6C, which are similar to those shown in FIGS. 5A to 5C, but which also illustrate how the beam power can be determined using Rayleigh scattering measurements. As previously for FIG. 5A, FIG. 6A is a reproduction of the displayed beam trace showing the imaged beam as recorded in the CCD camera 12 of FIG. 1. From the theory of Conservation of Energy, the pixel sum of the total intensity at every point across the image should be approximately constant, since there are very small losses as the beam propagates. Therefore, a plot of the total integrated intensity of all of the pixels across the width of the beam, as calculated at each point down the beam path, should result in an approximately constant plot, indicative of the power of the beam. This can be seen in the two lower, pale gray traces, shown in the plot of FIG. 6B, where the integrated beam intensity at each point down the beam is plotted as a function of the position down the beam. The lower pale gray trace is the zero level, while the upper pale gray trace shows the instantaneous power at each location down the beam. The average value shown is approximately 6000, which is a relative power value. The spikes in the data are due to scattering from particles in the beam, as seen also in the images of the beam itself in FIG. 6A. These peaks can be subtracted out by any of the filtering or pulse discrimination methods described hereinabove.

As previously, FIG. 6C is a calculated plot of the cross section of the beam at the position of the cursor in FIG. 6A.

The method shown in FIGS. 6A to 6C for measuring beam power is subject to error because of the effect of environmental scatter on the measurement. Such environmental scatter from the background could be as large as the Rayleigh scattering which it is being attempted to measure. When such environmental effects are taken into account, it is found that the measurement technique is linear with power, as expected from Rayleigh scattering. This enables the non-contact measurement of relative power of lasers that can easily be calibrated at a single power level to obtain absolute measurements.

Figure 7:
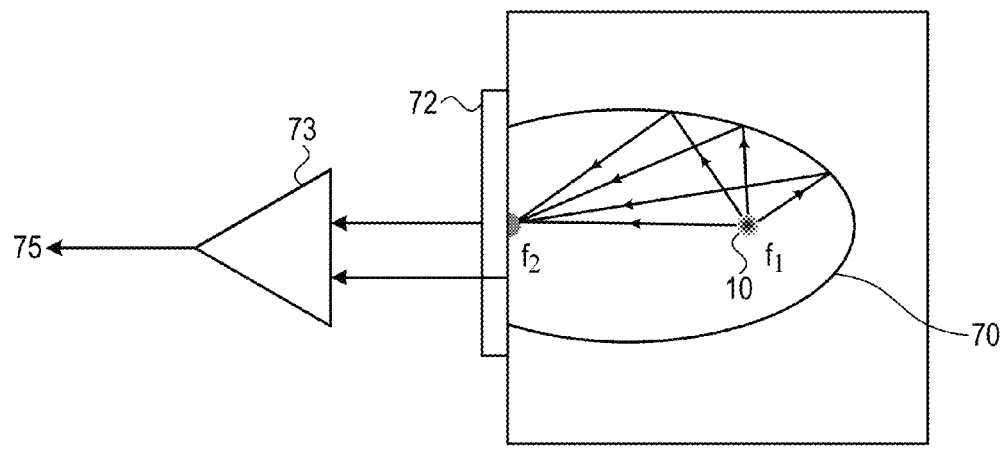
FIG. 7 illustrates a cross sectional schematic view of an exemplary sensor head, for non contact measurement of the laser beam power using the Rayleigh scattered light from the beam, using a reflector cavity having an elliptic shape.

However, in order to reduce such environmental background effects, it is preferable to use some sort of light shielding arrangement. Reference is now made to FIG. 7, which illustrates a cross sectional schematic view of an exemplary head, for such non contact measurement of the laser beam power using the Rayleigh scattered light from the beam, and which involves a geometry which reduces background illumination interference. In the implementation shown in FIG. 7, the measurement head comprises a reflector cavity having an elliptic shape 70, which is positioned such that the beam 10 passes through the first focal point f1 of the elliptic shape. This position can be ensured, for instance by covering the end faces of the cavity, i.e. those in the plane of the drawing, with plates (not shown in FIG. 7 to avoid reducing the clarity of the drawing) each having an aperture positioned collinear with the focal point f1. If the beam is input and output through these apertures, it will pass through the focus f1. Because of the elliptic shape of the reflector, light emitted in any direction from the first focal point f1 will impinge on the second focal point f2. A signal detector 72 is placed such that the second focal point f2, lies on or close to its absorbing or detecting surface. Therefore any Rayleigh scattered light emitted by the laser beam 10, will impinge on the detector 72, whether it undergoes reflection on the elliptical mirror surface 70, or whether it reaches the detector surface directly without reflection. The head thus operates as an optical integrating device, collecting all of the light scattered from the beam by Rayleigh scattering. The detector 72 is connected to a preamplifier 73 and the output signal 75 is input to further electronic amplification and signal processing circuitry, to display the power of the beam at the sampling point. Since the measurement head is a closed cavity, the effect of the background reflection and interference is significantly reduced. However light scattered from dust and debris particles in the air will cause spuriously readings, such that the methods described hereinabove for removal of pulses originating from scattering off dust and the like may also need to be adopted in this power measurement technique. However, the fact that the beam sampling region is enclosed with the exception of the beam entry and exit apertures, contributes to a reduction in the level of any particular interference.

Figure 8:
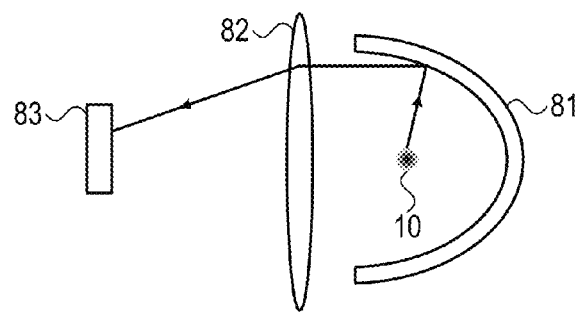
FIG. 8 illustrates schematically a parabolic reflector Rayleigh scattering power meter sensor head.
Figure 9:
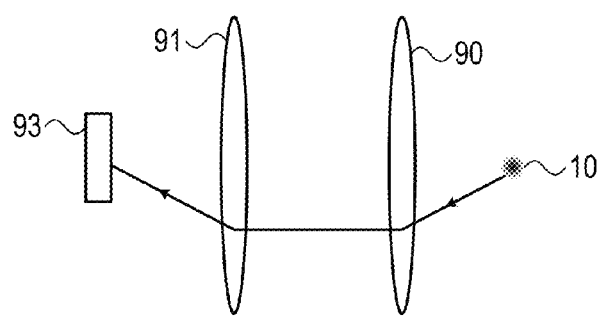
FIG. 9 shows a doublet lens focusing arrangement for collecting Rayleigh scattered light from the traversing beam, for power measurement.

FIG. 7 is only one example of a power measurement head in which the Rayleigh scattered light from a large angular range around the axis of the beam is directed towards the detector. Reference is now made to FIGS. 8 and 9 which illustrates schematically further examples by which this can be achieved. In FIG. 8, there is shown a parabolic reflector surface 81 with the beam 10 to be measured arranged to pass through its focal point, such that all of the Rayleigh scattered light emitted by the beam in directions where it will intercept the parabola, is reflected in a collimated direction parallel to the center axis of the parabolic reflector. A lens 82 positioned in front of the parabolic reflector opening, focuses this collimated light towards the focal point of the lens, and as previously, the detector 83 is positioned so that the focus lies in its plane. This structure thus also ensures that Rayleigh scattered light from angular orientations approaching 360° around the beam will be impinged onto the detector and measured.

Reference is now made to FIG. 9, which illustrates yet another exemplary scheme for collecting Rayleigh scattered light from a beam, from a plurality of radial directions, for power measurement. In this scheme, the scattered light is collected by the aperture of a first positive lens 90, located at its focal distance from the beam path position. The collimated parallel light generated at the output of this lens is then focused by a second positive lens 91, with the detector 93 located at its focus, such that the double lens arrangement transfers all of the light collected by the first lens 90 into the detector 93. The entire optical arrangement can be enclosed in a cavity to shelter it from extraneous scattered light. Although this arrangement does not collect the Rayleigh scattered light from such a large range of angles as the implementations of FIGS. 7 and 8, it does provide significantly higher illumination levels than the direct system shown in FIG. 1.

Figure 10:
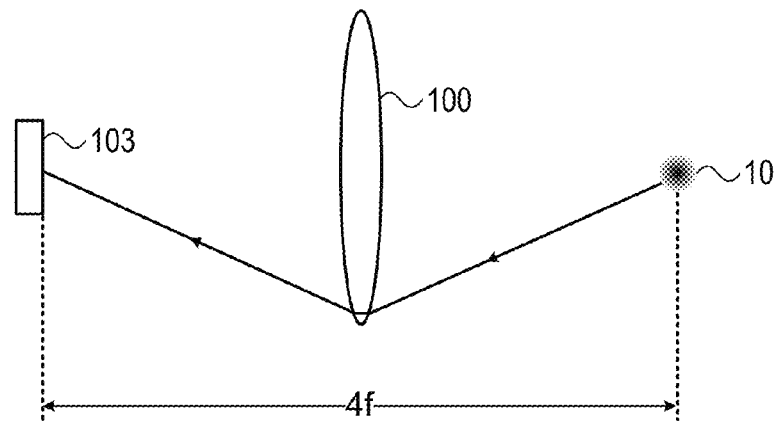
FIG. 10 illustrates schematically another exemplary optical arrangement, which is a simplified version of that shown in the head of FIG. 9, using a single positive lens.

Reference is now made to FIG. 10, which illustrates schematically another exemplary optical arrangement, which is a simplified version of that shown in the head of FIG. 9. In the implementation of FIG. 10, a single positive lens 100 is used for imaging the lights scattered from the laser beam 10 onto the detector surface 103. In order to obtain optimum collection and transfer of light, the distance from the beam path to the detector should be $4f$, where f is the focal length of the lens, and the lens should be positioned halfway between the laser beam 10 and the detector surface 103.

Figure 11:
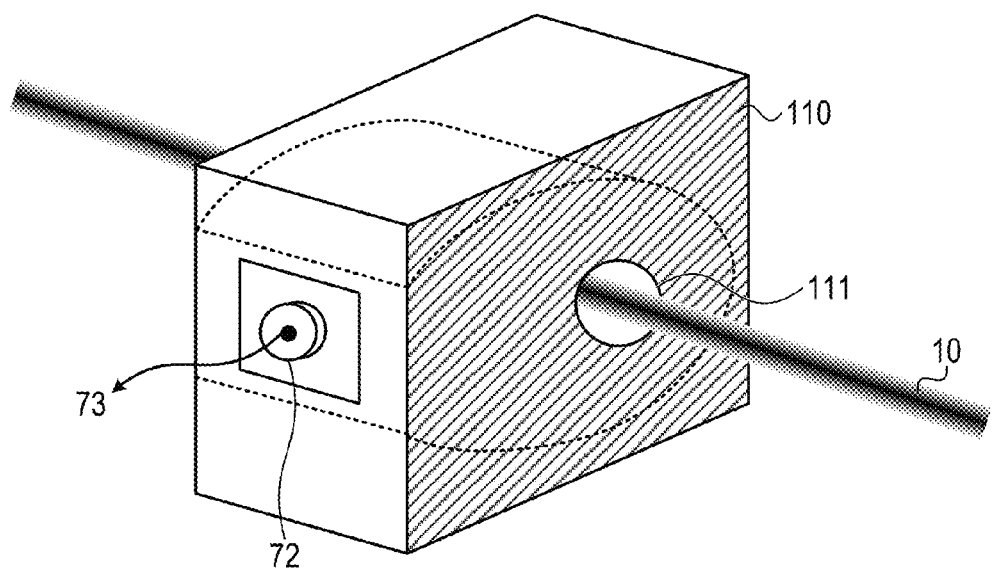
FIG. 11 is a schematic isometric rendering of the elliptic cavity head shown in cross-section in FIG. 7.

Reference is now made to FIG. 11, which is a schematic isometric rendering of the elliptic cavity head shown in cross-section in FIG. 7. FIG. 11 shows how the elliptic cavity has end plates 110, with an aperture 111 for entry and exit of the laser beam 10. By this means, the entry of undesired ambient background scattering from the environment is reduced to a minimum. The background scattering can be reduced even more if a stack of apertured plates, having their apertures co-aligned, is disposed at the entrance and exit apertures 111 of the head, thereby further limiting the entry angle of any background radiation.

Furthermore, in any of the implementations shown in FIGS. 7 to 11, the use of an internal parallel baffle array may be advantageous in order to increase measurement immunity from stray scattered light, as is known in the art. The baffles are arranged to be located at or close to the entrance face of the detector, and parallel to the average direction of incidence of the detected light, which should be perpendicular to the beam path in the head, and along the measurement axis of the head. This position of the baffle plates restricts the field of view of the detector to the light impinging on it normally or close to normally, thus reducing even more effectively, incidence of background light from the beam apertures at the sides of the head.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. A method for characterizing a beam of light, said method comprising:
    imaging said beam of light while it is propagating in ambient air through a sampling region, such that images can be obtained of light scattered from said sampling region in a generally lateral direction to the direction of said beam propagation;
    treating image data associated with said images with a pulse discriminator to remove from said image data signals having at least one of intensity, spatial or temporal characteristics outside of predetermined parameters for said image data; and
    processing said treated image data to determine a characteristic of said beam of light at at least one location in said sampling region.

2. A system for characterizing a beam of light, said system comprising:
    a sampling region in the air through which the path of said beam of light passes;
    an imaging device focused onto at least part of said sampling region, such that it images light scattered in a generally lateral direction to the direction of the path of said beam of light;
    a pulse discriminator to remove from said images, data signals having at least one of intensity, spatial or temporal characteristics outside of predetermined parameters for said image data; and
    an image processor operating on image signals after treatment by said pulse discriminator, said image processor determining a characteristic of said beam of light at at least one location in said sampling region.

3. A system according to claim 2 wherein said image processor comprises a profile generator for the determination of the intensity of the scattered light as a function of position across said beam of light, such that said characteristic is an intensity profile of said beam of light.

4. A system according to claim 3, wherein said profile generator determines the width of said beam at said at least one location in said sampling region.

5. A system according to claim 4, wherein said determination of said beam width is performed at a plurality of locations along said beam, such that a spatial image of said beam is obtained along its propagation path.

6. A system according to claim 2 wherein said image processor integrates the image data associated with the intensity of the scattered light obtained across said beam of light, over a predetermined length of said beam path, such that said characteristic is a power measurement of said beam of light.

7. A system according to claim 2, wherein said pulse discriminator comprises at least one of a low pass filter, such that pulses of shorter temporal duration than a predetermined level are filtered out, or a threshold limiter, such that pulses of higher intensity than a predetermined level are filtered out.

8. A system according to claim 2, wherein said image processor determines said beam characteristic for a plurality of locations down the beam path, such that a spatial representation of said beam characteristic is obtained down the propagation path of said beam.

9. A system according to claim 8, wherein said pulse discriminator may include an algorithm for determining the spatial width of changes in the imaged intensity of said scattered light down the propagation path of said beam, and for filtering out pulses of narrower spatial width than a predetermined width.

10. A system according to claim 2, further comprising a laminar flow system for flowing filtered gas across said beam of light, such that particular contamination in the path of said beam of light is reduced.

11. A system according to claim 2, wherein said imaging device is adapted to image light scattered in a plurality of directions around the axis of said beam of light.

12. A system according to claim 11, further comprising at least one reflector for reflecting light scattered from at least one different radial direction, into said imaging device.

13. A system according to claim 11, further comprising a plurality of fiber optical devices, wherein light scattered from different radial directions is collected by separate fiber optical devices, and directed for imaging into said imaging device.

14. A system according to claim 2, wherein said beam of light is a laser beam, and said system enables said beam to be characterized without the need for the beam to contact any element in the beam path.

\* \* \* \* \*